(12) United States Patent
Subotsch

(10) Patent No.: US 8,500,931 B2
(45) Date of Patent: Aug. 6, 2013

(54) POLYMER FABRIC, METHOD OF MANUFACTURE AND USE THEREOF

(75) Inventor: Nick Subotsch, Highett (AU)

(73) Assignee: Peerless Industrial Systems Pty Ltd., Victoria (AU)

( * ) Notice: Subject to any disclaimer, the term of this patent is extended or adjusted under 35 U.S.C. 154(b) by 0 days.

(21) Appl. No.: 13/126,043

(22) PCT Filed: Oct. 27, 2009

(86) PCT No.: PCT/AU2009/001404
§ 371 (c)(1),
(2), (4) Date: Jul. 26, 2011

(87) PCT Pub. No.: WO2010/048664
PCT Pub. Date: May 6, 2010

(65) Prior Publication Data
US 2011/0272077 A1 Nov. 10, 2011

(30) Foreign Application Priority Data
Oct. 27, 2008 (AU) .................. 2008905548

(51) Int. Cl.
*E04F 13/02* (2006.01)
*C09J 5/02* (2006.01)
*B29C 65/52* (2006.01)
*B32B 37/12* (2006.01)
*B32B 37/18* (2006.01)
*E04B 1/00* (2006.01)

(52) U.S. Cl.
USPC .... 156/71; 156/306.9; 156/307.1; 156/307.3; 156/307.5; 156/307.7

(58) Field of Classification Search
USPC 156/71, 247, 249, 306.9, 307.1, 307.3–307.5, 156/307.7; 52/746.1, 746.11; 428/113
See application file for complete search history.

(56) References Cited

U.S. PATENT DOCUMENTS

| | | | | |
|---|---|---|---|---|
| 4,107,374 A * | 8/1978 | Kusunose et al. | ............. | 442/400 |
| 4,145,468 A * | 3/1979 | Mizoguchi et al. | ........... | 442/269 |
| 4,296,163 A * | 10/1981 | Emi et al. | ....................... | 428/212 |
| 4,511,619 A * | 4/1985 | Kuhnel et al. | ................. | 428/215 |
| 4,637,851 A * | 1/1987 | Ueno et al. | ................. | 156/272.6 |
| 4,664,936 A * | 5/1987 | Ueno et al. | .................... | 427/538 |
| 5,230,701 A | 7/1993 | Meyer et al. | | |
| 5,272,198 A | 12/1993 | Kaminski et al. | | |
| 5,334,446 A * | 8/1994 | Quantrille et al. | .............. | 442/35 |
| 5,442,815 A | 8/1995 | Cordova et al. | | |
| 6,387,479 B1 * | 5/2002 | Hayashi et al. | ............ | 428/297.4 |
| 6,867,253 B1 | 3/2005 | Chen | | |
| 7,854,716 B2 * | 12/2010 | Schuren et al. | .................. | 602/75 |
| 7,967,932 B2 * | 6/2011 | Umeda et al. | ................. | 156/180 |
| 8,153,238 B2 * | 4/2012 | Hall et al. | ................. | 428/195.1 |
| 2001/0004492 A1 * | 6/2001 | Hayashi et al. | ............ | 428/297.4 |
| 2002/0009581 A1 * | 1/2002 | Kishi et al. | ................. | 428/293.1 |
| 2002/0153086 A1 * | 10/2002 | Alper et al. | ................. | 156/161 |
| 2004/0005834 A1 * | 1/2004 | Zhou et al. | .................... | 442/328 |
| 2004/0214494 A1 * | 10/2004 | Murphy et al. | ............... | 442/149 |
| 2005/0176867 A1 * | 8/2005 | He et al. | ........................ | 524/487 |
| 2006/0035088 A1 * | 2/2006 | Takano et al. | .................. | 428/413 |
| 2006/0135724 A1 | 6/2006 | Lawrey et al. | | |
| 2007/0051463 A1 * | 3/2007 | Waggoner et al. | ............ | 156/292 |
| 2008/0099131 A1 * | 5/2008 | Umeda et al. | ................. | 156/201 |
| 2008/0185753 A1 * | 8/2008 | Takano et al. | ................. | 264/239 |
| 2008/0185757 A1 * | 8/2008 | Takano et al. | ................. | 264/319 |
| 2009/0004430 A1 * | 1/2009 | Cummins et al. | ............. | 428/113 |
| 2009/0202832 A1 * | 8/2009 | Takano et al. | ................. | 428/392 |
| 2012/0100351 A1 * | 4/2012 | Covelli et al. | ................. | 428/196 |

FOREIGN PATENT DOCUMENTS

| | | | |
|---|---|---|---|
| CA | 2654885 | A1 | 12/2007 |
| WO | 0132416 | A1 | 5/2001 |
| WO | 2006086715 | A2 | 8/2006 |

* cited by examiner

*Primary Examiner* — Sing P Chan
(74) *Attorney, Agent, or Firm* — Volpe and Koenig, P.C.

(57) ABSTRACT

There is provided a polymer fabric that accommodates movement at or adjacent one or more respective surfaces without compromising structural integrity of the or each surface when the polymer fabric is affixed thereon. There is further provided methods of manufacture and application of the polymer fabric. The polymer fabric finds use in applications requiring sealing, containment, protection and insulation.

35 Claims, No Drawings

POLYMER FABRIC, METHOD OF MANUFACTURE AND USE THEREOF

FIELD OF THE INVENTION

The present invention relates to a polymer fabric useful in sealing joints and the like. The invention further relates to methods of manufacturing said polymer fabric and to uses thereof.

BACKGROUND TO THE INVENTION

There are numerous instances where it is desirable to provide a seal or sealing membrane on or adjacent one or more surfaces. Particularly in building constructions or industrial structures, it is often desirable to provide a seal or sealing membrane which has properties that can not only seal so as to prevent ingress of moisture and the like, but also accommodate movement of various construction materials that arise from normal expansion and contraction of these materials. Examples of such instances is on or adjacent expansion joints or similar assemblies and in the application of bitumen flashing. Throughout each day and the variety of seasons, building surfaces and other construction elements expand and contract due to normal warming and cooling. Where there is a meeting of surfaces, thermal stress induced by the thermal expansion and contraction can lead to cracking of the structures. This clearly compromises structural integrity of the total structure.

The problem can become compounded when the structure has a primary purpose of containing hazardous materials. As an example, bulk liquid storage tanks for petroleum generally experience high activity in filling and draining of the tank. This high loading and unloading activity can cause deflection of the base of the tank. Deflection of the base of the tank in turn can create a suction effect at the lip of the tank, permitting water and other substances to seep in underneath the tank. Over time, water seepage can lead to corrosion of the underside of the tank base, which not only brings about contamination of the surrounding ground and environment, but can also contaminate the remaining petroleum stored within the tank.

One known solution to circumvent problems such as these, or indeed of any instance where sealing is required but there are movement issues at or adjacent the respective sealing surfaces, is to provide a sealing membrane across the sealing surfaces. Referring again to the tank example, it has been known to install a "bootseal" comprised from a resilient epoxy compound having adhesive qualities as well as flexibility, across and over the tank lip and extending over the adjacent bitumen base surrounding the tank. The epoxy compound can be coupled with woven fibreglass for further reinforcement. The premise of the applied seal is that the intrinsic flexibility of the substance or substances from which the seal is manufactured, is sufficient to accommodate thermal expansion and contraction movements of the structure or structures to which it is applied.

However, it has been found that in at least some instances, an unfortunate effect in the application of a seal such as this is that the application of the seal itself can contribute to over-stressing of one or more of the surfaces to which the seal is applied. Where construction of adjacent surfaces is not sufficiently strong, overstressing, typically from nothing more than normal thermal contraction and expansion, can lead to cracks in the surfaces. This cracking clearly compromises the structural purpose of the applied seal.

There is therefore a need for a product or assembly which can not only provide a seal or membrane between adjacent surfaces, but which can also accommodate movement issues at or adjacent the respective sealing surfaces without compromising the structural integrity of those surfaces.

SUMMARY OF THE INVENTION

According to a first aspect of the present invention, there is provided a polymer fabric having properties that accommodate movement at or adjacent one or more respective surfaces without compromising structural integrity of the or each surface when the polymer fabric is affixed thereon. In one embodiment of the invention, the movement is that which is caused by normal thermal expansion and contraction activity.

In a preferred embodiment, the polymer fabric has elasticity such that the polymer fabric returns substantially to its original condition after removal of a tensile load. Preferably, the polymer fabric has an elasticity of greater than 200%, more preferably greater than 400%, most preferably greater than 600%. In one embodiment the polymer fabric has an elasticity of 800% or even greater. In another embodiment of the invention the polymer fabric has comparable elastic properties in both lateral and longitudinal directions.

In a yet further embodiment of the invention, the polymer fabric also has properties of flexibility. In a particularly preferred embodiment of the invention the polymer fabric has adhesive qualities, to enable adhesion to the or each surface to which it is to be affixed.

In a preferred embodiment of the invention, the polymer fabric is comprised from a plurality of elastomeric fibres and a binder matrix. The elastomeric fibres may be comprised of any natural or synthetic polymer or mixtures thereof that at ambient temperature may be stretched and/or expanded to greater than the original length of the fibre when the fibre is subjected to a tensile load and return substantially to the original condition after removal of a tensile load.

Preferably, the elastomeric fibres provide structural reinforcement to the polymer fabric. More preferably, the elastomeric fibres provide tear resistance to the polymer fabric. Preferably, the elastomeric fibres provide resistance to crack propagation perpendicular to the plane of said polymer fabric.

Non-limiting examples of binder matrices include liquid resins or binders, polyurethanes, polyureas, acrylics or epoxy resins or combinations thereof. Non-limiting examples of suitable elastomeric fibres that can be used in the present invention are one or more of spandex (elastane), Lycra®, or block copolymers of polyurethane and polyethylene glycol optionally in combination with one or more synthetic or natural fibres, for example, nylon, polypropylene or polyethylene. Denier of the individual filaments of the elastomeric fibres can be selected depending on the intended use of the polymer fabric.

In a further embodiment of the invention, a primer material may be applied to at least one of the one or more respective surfaces to improve fixation of the polymer fabric to the one or more respective surfaces.

In a yet further embodiment, the polymer fabric may be coated with a barrier forming material to modify the resistance to chemicals, UV radiation or other external influences. Preferably, the elastic properties of the barrier forming material are chosen to match those of the polymer fabric.

In a preferred embodiment, the binder matrix cures at ambient temperatures in the absence of applied heat, UV radiation or an external catalyst. The binder matrix desirably has good flexibility qualities whilst also having resilience.

In a further preferred embodiment, the polymer fabric may retain elastic properties at low temperatures. It has been found that the polymer fabric of the present invention may retain elastic properties even at liquid nitrogen temperatures. Elasticities of 200% or even greater are observed at −196° C.

According to a further aspect of the present invention, there is provided a method of producing a polymer fabric having properties of elasticity comprising the steps of:

a) applying a binder matrix to a membrane including elastomeric fibres; and b) permitting the binder matrix to cure or set.

The resulting polymer fabric is a membrane which advantageously exhibits properties of elasticity and preferably flexibility and/or tear resistance.

According to a further aspect of the present invention, there is provided a method of application of a polymer fabric, the method comprising placing a continuous portion of membrane having elastomeric fibres onto a surface and applying a binder matrix to the membrane. In one embodiment the membrane may be placed by wrapping or laying out and the binder matrix subsequently applied by spray, squeegee, flow, pour, or other means of saturating the membrane prior to cure or set. In such application binder matrices having relatively low viscosity may be advantageously utilised.

The resulting polymer fabric may advantageously adhere directly onto the surface and provide a continuous singular unit of polymer fabric, uninterrupted by joins or seams which can compromise the structural integrity and strength of the polymer fabric. The applied unit of polymer fabric is advantageously able to be affixed directly to a structure or surface in situ. However, a single unit of polymer fabric may also be preformed in any suitable shape or configuration prior to transporting and arrival at the site of application. Accordingly, the invention also provides a method of application of a polymer fabric, the method comprising pre-impregnating a continuous portion of membrane having elastomeric fibres with a binder matrix, packing the resulting impregnated membrane so as to preserve it in an uncured state for future use and removing the uncured impregnated membrane from the packing and allowing to cure without the need for further additives or processing.

In this particular embodiment, it is desirable to provide a binder matrix with appropriate viscosity such that upon opening of the package resin drainage and subsequent loss may be avoided. In this respect, binder matrices having relatively higher viscosities and preferably thixatropic properties may be advantageously utilised.

In a yet further aspect of the present invention, there is provided various uses of the polymer fabric of the invention. Non limiting examples of such use include the following:

a) joining or bridging sheets of material to provide a water proof joint in bathrooms or wet areas or as a tape to join sheets on floors, walls or between walls and floors or corners, b) over coating joints in concrete or base materials to provide a water stop to contamination of underlying areas from chemicals or compounds such as bunds and containment facilities, c) over coating joints in concrete or base materials to control water leaking from reservoirs, spillways, water courses or other conveyances so as to reduce losses or prevent erosion, d) on roofing to provide a continuous unbroken lining that protects and/or insulates from the elements, e) encasing or wrapping hazardous materials such as asbestos or lead based paint thereby minimising environmental exposure, f) as an internal lining of liquid gas, such as LNG or LPG, containers to contain and/or insulate the cargo, g) to wrap piping and other equipment to mitigate corrosion, h) to line cracks in reservoirs, vessels and tanks to prevent leakage of their contents, i) application between a tank or vessel base and the substrate upon which it sits so as to prevent moisture entering and corroding the underside of the tank or vessel, j) applying directly over cracks to provide a seal whilst allowing the crack to move as necessary, k) wrapping pipes for underground installation wherein the polymer fabric protects the pipe from the impact of soil, rock or corrosion damage.

Throughout this specification, use of the terms "comprises" or "comprising" or grammatical variations thereon shall be taken to specify the presence of stated features, integers, steps or components but does not preclude the presence or addition of one or more other features, integers, steps, components or groups thereof not specifically mentioned.

DETAILED DESCRIPTION OF THE INVENTION

It will now be convenient to describe the invention with reference to particular embodiments and examples. These embodiments and examples are illustrative only and should not be construed as limiting upon the scope of the invention. It will be understood that variations upon the described invention as would be apparent to the skilled addressee are within the scope of the invention. Similarly, the present invention is capable of finding application in areas that are not explicitly recited in this document and the fact that some applications are not specifically described should not be considered as a limitation on the overall applicability of the invention.

In one embodiment, the polymer fabric of the present invention comprises a combination of a binder matrix and a plurality of elastomeric fibres. In a preferred embodiment, the elastomeric fibres are provided as copolymer fibres produced from polyurethane and polyethylene glycol and consisting of rigid and flexible segments. The elastomeric fibres are provided in the form of a membrane, such as a portion of elastomeric fabric. Non-limiting examples of elastomeric fabrics are spandex (elastane) and those variations sold under proprietary trade marks such as Lycra, Elaspan, Dorlastan and Linel.

Traditionally, these sorts of elastomeric fibres and fabrics have been used exclusively in the fashion or apparel industries, for manufacture of articles of clothing and various garments. Whilst elastomeric fibres may have revolutionised the clothing industry, to date, these sorts of fabrics have not found useful application in industry, nor have they been considered for suitability in such areas of application.

The elastomeric fibres are provided in the form of a portion of woven fabric or membrane in which elastomeric fibres are present in at least a small percentage of the total composition of the fabric weave. Desirably, the fabric or membrane can be provided in any size and shape suitable for a specific application. In this manner, the final polymer fabric can be applied as a single continuous component, as will be discussed below.

The portion of membrane is combined with a binder matrix. The binder matrix is provided in a liquid form and applied to the membrane. Application of the binder matrix can be as simple as painting the liquid onto the membrane.

The binder matrix is provided in the form of any suitable liquid resin that may provide qualities of flexibility once the binder matrix has cured or set to a solid form. Non-limiting examples of suitable binder matrices are polyurethane and epoxy resins. The binder matrix, once set to a solid form, preferably has good flexibility properties.

The cure time of the binder matrix may be varied widely by appropriate selection of the binder composition. Preferred cure times are in the range of 30 minutes to 24 hours.

Furthermore, the workability (pot life) of the binder matrix may be varied through selection of the binder composition. Desirable workability is dependent on the particular application in question and preferably will fall within the range of 10 minutes to 1 hour.

Application of the binder matrix to the membrane and subsequent curing of the binder matrix forms the polymer fabric. The polymer fabric advantageously possesses both qualities of flexibility and elasticity. Furthermore, the combination of the components may impart significant tear resistance in the final polymer fabric. It has been found that the polymer fabric of the present invention exhibits tear resistance that is unmatched by traditional elastomeric materials, such as thermoset elastomers. It is apparent that the combination of woven membrane having elastomeric fibres within the binder matrix provides reinforcement to the binder matrix, which advantageously provides a product which has greater tear resistance than materials having no such reinforcement.

Depending on the binder matrix selected, the polymer fabric may also have adhesive qualities, assisting in the fixation of the polymer fabric directly onto surfaces or across two or more adjacent surfaces.

These properties of the polymeric fabric make the fabric suitable for numerous industrial applications, particularly in situations where it is desired to provide sealing between surfaces, but there are movement issues at or adjacent the respective sealing surfaces, as discussed above. The polymer fabric, once adhered to respective surfaces, can not only flex in response to normal thermal expansions and contractions, but also stretches and retracts at the same time. As a result, the fabric polymer can appropriately and adequately provide a seal between adjacent surfaces whilst causing no stressing to or upon the surfaces themselves. That is, the polymer fabric is able to move in conjunction with normal expansion and contraction of the surfaces themselves, resulting in adequate sealing between surfaces with no stressing or cracking of the surfaces to which the polymer fabric has been applied.

Advantages are also attained from the preferred method of application of the polymer fabric. In known sealing applications, such as application of bitumen flashing tape, it is standard to place sections of flashing tape across surfaces so as to provide a suitable seal. However, where there is more than one join or adjacent surface, it is necessary to apply discrete portions of tape across surfaces so as to accomplish the entire seal. This method of application necessarily creates joins and overlaps of the tape. Joins in turn can potentially lead to structural weakness in the overall finished seal and can also contribute to stressing of surfaces from the normal thermal contractions and expansions.

In contrast to the application of discrete lengths of tape, the polymer fabric of the present invention can advantageously be provided and applied as a single continuous unit, having no joins or breaks to compromise the structural integrity of the overall seal. The preferred method of application of the polymer fabric comprises providing a single continuous portion of woven fabric or membrane having elastomeric fibres woven therein. The portion of fabric is comparable in shape and configuration to the area to which the seal is to be applied. That is, the shape and configuration accords to the entire area of application of the final seal.

The single continuous fabric portion is placed upon the surface or surfaces requiring sealing. The suitable binder matrix is then applied directly onto the fabric portion. Since the binder matrix may be selected to have required adhesive qualities to enable adhesion to the desired surface, application of the binder matrix to the fabric portion enables adhesion of the resulting polymer fabric to the surface or surfaces.

This method of application advantageously permits direct application at the desired site. Further, the binder matrix is selected such that it requires no special curing process or application of primers in order to set the final polymer fabric as a seal upon surfaces. That is, the binder matrix, once applied to the portion of woven fabric, sets or cures without any special curing methods or application of further products. This is in contrast to traditionally used elastomers such as rubber, which is sticky and can easily deform when warm and is brittle when cold. In this state, in cannot be used to make articles with a good level of elasticity and in any event, if left in a natural state, will eventually disintegrate. Rubber requires treatment by vulcanisation or other curing methods in order to attain good properties of elasticity and flexibility. Such treatment methods are completely unnecessary in application of the present invention. Further, elastomers such as rubber have limited or no adhesive qualities and are often unsuitable for attaching directly upon a surface.

Whilst direct application as described above is a preferred method of application of the polymer fabric, it is also within the scope of the invention to manufacture the polymer fabric as a factory prepared unit prior to transportation and installation at the desired location. The woven fabric portion is, as described above, cut out or otherwise provided in a shape and size that is comparable to the shape and size of the desired final seal. The fabric portion can be arranged upon a mould or other suitable structure that replicates the dimensions and configuration of the structure or structures to which the completed seal is intended to be applied. The binder matrix is applied to the fabric portion as described above, thereby creating a final unit of polymer fabric as a single, continuous element having no seams or joins. Advantageously, the preformed unit is packed, for example in foil, so as to preserve the binder matrix in an uncured state.

This single pre-formed unit of polymer fabric can then be transported and applied to a surface or surfaces as required, such as by adhering the polymer fabric unit in place with the same or similar materials used in its construction. As an example, the binder matrix used in construction of the polymer fabric can be applied to the surface or surfaces and the prefabricated polymer fabric unit placed thereupon. The nature of the binder matrix applied to the surface and of the prefabricated unit is such that there is bonding therebetween, creating the same continuous sealing construction as when the woven fabric and binder matrix are applied directly on site as described above.

It is therefore apparent that the polymer fabric of the present invention provides a convenient product that advantageously exhibits features of elasticity, flexibility and tear resistance that has to date not been achieved in any other product, particularly products used in the creation of seals between adjacent surfaces. Further, the present invention also provides a convenient method of manufacture and application of the polymer fabric to readily and efficiently create a seal upon or between surfaces that accommodates movement in and between each surface.

It will be further apparent that the polymer fabric of the present invention may find utility in a wide range of applications. Particularly noteworthy are applications requiring sealing, containment, protection and insulation and combinations thereof. The following examples illustrate the advantageous application of the polymer fabric of the present invention.

a) The polymer fabric may be used to join or bridge sheets of material to provide a water proof joint in bathrooms or wet areas. The polymer fabric may also be used in the form of a tape to join sheets of material on floors, walls or between walls and floors or corners.

b) The polymer fabric may be used to over coat joints in concrete or base materials to provide a water stop to contamination of underlying areas from chemicals or compounds such as bunds and containment facilities.

c) The polymer fabric may be used to over coat joints in concrete or base materials to control water leaking from reservoirs, spillways, water courses or other conveyances so as to reduce losses or prevent erosion.

d) The polymer fabric may be used on roofing to provide a continuous unbroken lining that protects and/or insulates from the elements.

e) The polymer fabric may be used to encase or wrap hazardous materials such as asbestos or lead based paint, thereby minimising environmental exposure.

f) The polymer fabric may be used as an internal lining of liquid gas, such as LNG or LPG, containers to contain and/or insulate the cargo.

g) The polymer fabric may be used to wrap piping and other equipment to mitigate corrosion.

h) The polymer fabric may be used to line cracks in reservoirs, vessels and tanks to prevent leakage of their contents.

i) The polymer fabric may be used as an application between a tank or vessel base and the substrate upon which it sits, so as to prevent moisture entering and corroding the underside of the tank or vessel.

j) The polymer fabric may be used to apply directly over cracks to provide a seal whilst allowing the crack to move as necessary.

k) The polymer fabric may be used to wrap pipes for underground installation wherein the polymer fabric protects the pipe from the impact of soil, rock or corrosion damage.

EXAMPLES

The following Examples describe the use of the polymer fabric according to the present invention and are intended to illustrate the invention. The Examples are not be construed as limiting in any way the scope of the present invention.

Example 1

A polymer fabric comprising 91% Tactel® nylon/9% Lycra® fabric weave (225 g/m$^2$) and a polyurethane binder matrix derived from MDI (methylene diphenyl diisocyanate) was applied directly over a crack in a concrete reservoir structure from which water was escaping. The polymer fabric provided an effective seal but also allowed the concrete surface to continue to move through normal expansion and contraction. This advantageous property contrasts with direct injection of the crack with sealant which affords the possibility that ongoing contraction or movement will force another crack in new location.

Example 2

A polymer fabric comprising 90% nylon/10% elastane fabric weave and a polyurethane binder matrix derived from MDI (methylene diphenyl diisocyanate) was used as a bootseal on tanks in a petroleum refinery to effectively prevent moist air from flowing through under the base. In the absence of the polymer fabric bootseal, moist air may ingress resulting in corrosion of the tank and eventual failure.

Example 3

Polymer fabrics were prepared comprising 91% polypropylene/9% elastane fabric weave (250 g/m$^2$) or 91% Tactel® nylon/9% Lycra® fabric weave (275 g/m$^2$) and a polyurethane binder matrix derived from either MDI (methylene diphenyl diisocyanate) or TDI (toluene diisocyanate).

The polymer fabrics were used to internally seal a concrete wine fermentation tank. The corners of the tank were originally bonded and had subsequently cracked due to expansive movement forces. The polymer fabrics provided an effective seal whilst allowing the surfaces of the tank at the corners to continue to move through expansion and contraction.

Example 4

Water was weeping from dry joints and cracks in an internal water reservoir. Application of a polymer fabric comprising 91% Tactel® nylon/9% Lycra® fabric weave (225 g/m$^2$) and a polyurethane binder matrix derived from MDI (methylene diphenyl diisocyanate) sealed the cracks but continued to allow the walls of the reservoir to move through expansion and contraction.

Example 5

A polymer fabric comprising 91% Tactel® nylon/9% Lycra® fabric weave (225 g/m$^2$) and a polyurethane binder matrix derived from MDI (methylene diphenyl diisocyanate) was applied over an expansion joint on concrete trafficable areas to prevent corrosive chemicals getting into the underlying soil and polluting or damaging the substrata.

Example 6

A polymer fabric comprising 90% nylon/10% elastane fabric weave (270 g/m$^2$) and a polyurethane binder matrix derived from MDI (methylene diphenyl diisocyanate) was used to seal the area between a pipe in a bund wall as a permanent fixture and a pipe running through it as the actual fluid pipe, so as to prevent any overflow of liquor in the bund from seeping outside the bund.

The invention claimed is:

1. A method of sealing, containing, protecting, insulating, or combinations thereof, industrial structures or equipment or building construction, the method comprising:
    placing a continuous portion of an elastic polymer fabric composition onto a surface of the industrial structures or equipment or building construction, the elastic polymer fabric composition comprising a binder matrix, and a polymer fabric including a plurality of elastomeric fibres,
    wherein the binder matrix is selected from the group consisting of liquid resins, liquid binders, polyurethanes, polyureas, acrylics epoxy resins, and, mixtures thereof; and
    the elastomeric fibres include one or more fibers selected from the group consisting of elastane and block copolymers of polyurethane and polyethylene glycol; and
    the elastic polymer fabric composition has properties that accommodate movement at or adjacent one or more respective surfaces without compromising structural integrity of the surface when the composition is affixed thereon.

2. The method according to claim 1, wherein the elastic polymer fabric composition has elasticity such that the polymer fabric composition returns substantially to its original condition after removal of a tensile load.

3. The method according to claim 1, wherein the elastic polymer fabric composition has an elasticity of greater than 200%.

4. The method according to claim 1, wherein the elastic polymer fabric composition has an elasticity of greater than 800%.

5. The method according to claim 1, wherein the elastic polymer fabric composition has comparable elastic properties in both lateral and longitudinal directions.

6. The method according to claim 1, wherein the elastic polymer fabric composition has flexibility.

7. The method according to claim 1, wherein the elastomeric fibres provide structural reinforcement to the elastic polymer fabric composition.

8. The method according to claim 1, wherein the elastomeric fibres provide tear resistance to the elastic polymer fabric composition.

9. The method according to claim 1, wherein the elastomeric fibres provide resistance to crack propagation perpendicular to the plane of the elastic polymer fabric composition.

10. The method according to claim 1, wherein a primer material is applied to at least one of the one or more respective surfaces to improve fixation of the elastic polymer fabric composition to the one or more respective surfaces.

11. The method according to claim 1, wherein the elastic polymer fabric composition is coated with a barrier forming material to modify the resistance to chemicals, UV radiation or other external influences.

12. The method according to claim 11, wherein the elastic properties of the barrier forming material are chosen to match those of the elastic polymer fabric composition.

13. The method according to claim 1, wherein the binder matrix cures at ambient temperatures in the absence of applied heat, LTV radiation or an external catalyst.

14. The method according to claim 1, wherein the elastic polymer fabric composition retains elastic properties at a temperature of −196° C.

15. The method of claim 1 further comprising applying the binder matrix to the polymer fabric.

16. The method of claim 1 further comprising pre-impregnating a continuous portion of the polymer fabric with the binder matrix to form the elastomeric polymer fabric composition, packing the elastomeric polymer fabric composition in a packing so as to preserve it in an uncured state for future use, removing the elastomeric polymer fabric composition from the packing and allowing the elastomeric polymer fabric composition to cure without the need for further additives or processing.

17. The method according to claim 1 in joining or bridging sheets of material to provide a water proof joint in bathrooms or wet areas or as a tape to join sheets on floors, walls or between walls and floors or corners.

18. The method according to claim 1 in over coating joints in concrete or base materials to provide a water stop to contamination of underlying areas from chemicals or compounds such as bunds and containment facilities.

19. The method according to claim 1 in over coating joints in concrete or base materials to control water leaking from reservoirs, spillways, water courses or other conveyances so as to reduce losses or prevent erosion.

20. The method according to claim 1, wherein the surface is roofing and the method provides a continuous unbroken lining that achieves one or more of protecting or insulating from the elements.

21. The method according to claim 1 to encase or wrap hazardous materials, thereby minimising environmental exposure.

22. The method of claim 21, wherein the hazardous materials include asbestos or lead based paint.

23. The method according to claim 1, wherein the surface is an internal surface of a liquid gas container and the method provides an internal lining of the liquid gas container to contain or insulate the cargo.

24. The method of claim 23, wherein the liquid gas includes liquid natural gas or liquid petroleum gas.

25. The method according to claim 1 to wrap piping and other equipment to mitigate corrosion.

26. The method according to claim 1 to line cracks in reservoirs, vessels and tanks to prevent leakage of their contents.

27. The method according to claim 1 by applying between a tank or vessel base and the substrate upon which it sits so as to prevent moisture entering and corroding the underside of the tank or vessel.

28. The method according to claim 1 by applying directly over cracks to provide a seal whilst allowing the crack to move as necessary.

29. The method according to claim 1 for wrapping pipes for underground installation, wherein the elastic polymer fabric composition protects the pipe from the impact of soil, rock or corrosion damage.

30. The method of claim 1, wherein the elastomeric fibers are in combination with one or more synthetic or natural fibers.

31. The method of claim 30, wherein the one or more synthetic or natural fibers are selected from the group consisting of nylon, polyethylene and polypropylene.

32. The method according to claim 1, wherein the elastic polymer fabric composition has an elasticity of greater than 400%.

33. The method according to claim 1, wherein the elastic polymer fabric composition has an elasticity of greater than 600%.

34. The method of claim 1, wherein the step of placing a continuous portion of polymer fabric includes wrapping the surface or laying out the polymer fabric on the surface and the step of applying the binder matrix includes saturating the polymer fabric prior to cure.

35. The method of claim 34, wherein saturating the polymer fabric prior to cure includes spraying, squeegeeing, flowing, or pouring.

* * * * *

UNITED STATES PATENT AND TRADEMARK OFFICE
CERTIFICATE OF CORRECTION

| | | |
|---|---|---|
| PATENT NO. | : 8,500,931 B2 | |
| APPLICATION NO. | : 13/126043 | |
| DATED | : August 6, 2013 | |
| INVENTOR(S) | : Nick Subotsch | |

It is certified that error appears in the above-identified patent and that said Letters Patent is hereby corrected as shown below:

IN THE CLAIMS

In claim 1, at column 8, line 58, delete "acrylics epoxy resins" and insert therefor --acrylics, epoxy resins--.

Signed and Sealed this
Third Day of December, 2013

Margaret A. Focarino
*Commissioner for Patents of the United States Patent and Trademark Office*